United States Patent [19]

Pollock

[11] Patent Number: 5,422,829

[45] Date of Patent: Jun. 6, 1995

[54] CLOSED-LOOP CONTROL FOR SCANNING APPLICATION

[76] Inventor: Eugene J. Pollock, 502 Dory Ave., Fort Walton Beach, Fla. 32548

[21] Appl. No.: 913,671

[22] Filed: Jul. 14, 1992

[51] Int. Cl.6 .................................................. G01S 7/00
[52] U.S. Cl. ...................................... 364/516; 342/133
[58] Field of Search .................... 342/75, 133; 364/516

[56] References Cited

U.S. PATENT DOCUMENTS

| 3,134,972 | 5/1964 | Barth et al. | 342/75 |
| 4,179,696 | 12/1979 | Quesinberry et al. | 342/75 |
| 4,272,783 | 6/1981 | Warnstam et al. | 364/516 |
| 4,320,287 | 3/1982 | Rawicz | 364/516 |
| 4,622,458 | 11/1986 | Boeck et al. | 364/516 |
| 5,062,056 | 10/1991 | Lo et al. | 364/516 |
| 5,128,684 | 7/1992 | Brown | 364/516 |

Primary Examiner—Ellis B. Ramirez
Assistant Examiner—Thomas Peeso
Attorney, Agent, or Firm—Pollock, Vande, Sande & Priddy

[57] ABSTRACT

An error-free tracking system is disclosed which can operate with a scanning sensor. Beginning with an initialized trajectory for an object, predictions are made with respect to future object position and the sensor produces an error signal representing an error between sensor position (predicted target position) and actual target position at the measurement time. From a sequence of error signals, trend information is extracted and, on the basis of the trend information, the gain of a trajectory correction algorithm is adjusted. Based on the corrected trajectory, a new position estimate is determined. This further estimate is then used for another measurement to produce a further error signal in order to provide for tracking the object or target.

9 Claims, 3 Drawing Sheets

FIG.1

CLOSED-LOOP CONTROL FOR SCANNING APPLICATION

DESCRIPTION

1. Field of the Invention

The invention relates to improvements in object tracking, such as by radar as well as in related guidance and control and other applications implementing motion equations.

2. Background Art

Applicant's Patents 4,071,744 and 4,825,055 describe the advantages of loop integration techniques and, in Patent 4,825,055, application of closed-loop techniques to an object tracking mode wherein the sensor physically points at and thereby tracks the object in position. The subject matter of the referenced patents is incorporated herein by this reference.

The present invention applies the principles described in the foregoing patents to application(s) in which the sensor does not continuously physically point at the object to implement tracking.

My prior Patent 4,825,055 deals with a system wherein the sensor (or multiple sensors on a single mount) physically points at the target. The present invention deals with systems wherein a single sensor and its mount do not continuously physically point at the target. Motion sensors such as radar systems can be broken down into two classes, one of which uses a moving reflector to position the beam, as opposed to the second class which moves the beam of energy by electrical means such as in a phased array.

The moving reflector systems can either track by continuously physically pointing at the target or track while scanning. The second class of course cannot physically point at the target. Thus, this invention deals with radars of the second class as well as those radars of the first class which track while scanning.

In general, aside from the patents referenced above, the prior art systems are grossly deficient for one or more of the following reasons.

The referred to prior art is incapable of detecting, and therefore does not handle, dynamic lag. Traditional scanning radars (and other similar devices) are grossly inaccurate because their data processing is open loop (no trajectory feedback), post-measurement, and without physical observability allowing large dynamic lag (target-sensor separation) error, the magnitude of which increases almost exponentially as a function of target dynamics. Dynamic lag is target-sensor separation occurring from a post-measurement lack of physical observability, open loop processing and after-measurement-time processing of already-collected trackpoint measurements.

Open-loop processing is the use of target off-set position data that is ill-defined as a function of signal to noise and target dynamics. Open-loop processing target-sensor separation can be zero, but only when its signal to noise ratio is infinite and its target dynamics are zero. Target-sensor separation increases as the signal to noise ratio decreases and as target dynamics are allowed. By far, the most destructive cause of target-sensor separation are open-loop target offset from sensor-null position measurements. An open-loop position sensor measurement is a measurement of the distance or off-set of the target from sensor-null.

Valid operational control requires that a target be precisely located and remain precisely located relative to its sensor to allow valid trajectories to be measured. But, sensor offset measurements, most often, are not well-defined and are influenced by both non-infinite signal to noise ratios and the presence of target dynamics. It is extremely difficult to precisely define off-set from sensor-null, the basis of traditional equations of motion applications. These open-loop conditions cannot be modeled and therefore are beyond control and, at best, can be prevented.

Often, traditional sensor-target measurement data are collected and then after collection, albeit on-line, open loop processed to determine the trajectory. Post-flight data processing to make separate radars agree requires a data analyst to make changes to the data that destroys the validity of the data. A controller/analyst may never know that the target has separated from the sensor unless another precisely timed remote sensor, also geocentrically configured, can independently time-compare the same target, on-line.

When this is done, the results are always the same.

If the target is moving at a constant velocity, the target-sensor separation will routinely be moderate, i.e. hundreds of feet. If the target is accelerating at a constant rate, the separation error becomes quite large, i.e. thousands of feet. If the target is accelerating at a non-constant rate, e.g. a maneuver, the separation error becomes prohibitive, i.e. tens of thousands of feet or many miles.

Radar-to-radar testing, in a practical sense, seldom happens because traditional operational radar-produced trajectories are seldom on-line, or trajectory data is typically not directly transferrable to another radar.

Increasing target velocity has a significant inverse effect on target-sensor separation, since the fast target cannot quickly change its trajectory. The slower the target goes, the more quickly it can maneuver.

Target-sensor separation cannot be removed; it must be prevented. Target-sensor separation cannot be defined in a post-measurement error model, although its existence and impact are well-documented.

In addition to the foregoing, the referred to prior art does not accurately treat the system error model. Post-measurement target-sensor separation in data processing cannot be defined or removed because dynamic lag error are commingled with random and very dynamic system error.

The measured trajectories are of an apparent (illusionary) target and not the true target because of dynamic random, system and target-sensor separation errors. An exact post-measurement calibration estimate is improbable because its error model is incomplete, in part because of the missing dynamic lag in the model.

All trajectory data processing depends on a well-defined system error model; that traditionally simply does not exist, nor can it possibly exist with post-measurement control theory. Even when a well-defined error model and its dynamic coefficients are available, they cannot be used in post-flight processing, and different post-measurement "calibration" error model values must be introduced to find the expected solution.

Another source of error in the referred to prior art relates to the encoder.

The location of the target with reference to the scanning sensor cannot be defined or controlled, separated from its encoder. The scanning control must take its measured trackpoint from system encoders, that are triggered by the sensor rather than from its sensor itself.

Encoder trackpoints differ from their sensor trackpoints by dynamic system errors that allow target-sensor separation to continuously increase. As each after-measurement-time target-sensor measurement is processed, it continuously adds dynamic lag error directly to the post-measurement defined target trajectory.

SUMMARY OF THE INVENTION

The present invention avoids the problems evident in the prior art and is obtained in accordance with the invention by first predicting, based on a currently available trajectory, the future object position at a future measurement time. This allows physical observability of the target offset from the predicted track point at measurement time. Measurement time is that single epoch when sensor-target measurement comparisons can be made and observed to calibrate or to modify the current trajectory and at the same time to prevent dynamic lag.

Two types of target-sensor separation, guidance and control, are prevented by the invention.

The guidance target-sensor separation is measured, stored and prevented by the lag detector. The control or trajectory target-sensor dynamic lag is detected and prevented by the maneuver detector.

The maneuver detector assists in locking the sensor to the target. This makes the off-set measurement meaningful, allowing control over target-sensor dynamic lag.

Prediction dynamic lag must be separated from trajectory dynamic lag as each requires a different solution and bandwidth for prevention.

At-measurement-time prediction is the only alternative to post-measurement processing and calibration because it allows at-measurement-time observability.

Separate prediction permits an exact well-defined physically measured dynamic system error model to be introduced.

Separate prediction processing permits physical comparison (observation) of the sensor and its encoder to ensure that the combination is correct, thus preventing the separation of the target and the sensor.

Separate trajectory processing permits an at-measurement-time observation that prevents trajectory target-sensor separation by adjustment of its current trajectory based on a comparison of sequential target-sensor errors.

Accuracy, in accordance with this invention, is achieved by its calibration and sensor-target lock while its precision is limited primarily by its trajectory computation data rate.

The invention significantly improves system accuracy of scanning radars, using controlled predictions.

The invention finds use in scanning radar applications, from the search radar two-dimension continuous scan low trajectory determination rate, to three-dimension sector-scan radar at the medium rate of trajectory determination. The invention is also useful to all non-physically pointed sensors such as angle only sensors, range-only sensors and range-doppler sensors. The invention is specifically designed to prevent target-sensor separation in the scanning radar, that severely degrades the traditional (inaccurate) scanning radar control theory applications.

The change from inaccurate post-measurement open-loop estimation to exact closed-loop at-measurement-time physical measurement produces a whole new world of exact performance.

a. Exact operational prediction from error-free trajectories is in lieu of, at best, averaged error-contaminated predictions.

b. Lag-free next measurement prediction trackpoint is in contrast to target-sensor separation contaminated trackpoint.

c. Zero target-sensor separation is in lieu of non-defined ever increasing target-sensor separation.

d. Physically observable differences between the measurement and the predicted trackpoint is in lieu of ill-defined esoteric process observability.

e. Precision increases directly with the rate of trajectory determination.

f. Optimal process bandwidth for both guidance and control is in lieu of critically limiting single common bandwidth processing.

g. The scanning (controlled prediction) radar is readily integrated into a synergistic network, communicating without search using accurate trajectories only.

A significant (perhaps the most significant) difference between the present invention and that of Patent 4,825,055 is the fact that the system described in Patent 4,825,055 includes a sensor which necessarily physically always points at the target (at least during those times when data is being collected from the target). The present invention, on the other hand, extends to systems wherein the sensor is not physically pointed at the target. As a consequence of this difference, in the system of Patent 4,825,055, target position can be measured at random, i.e. at any time. To the contrary, however, in accordance with the present invention target position measurements can only be made when the sensor physically points at the target. One consequence of this fact is that the rate of data acquisition in the present invention is limited to times at which the sensor, during scanning, passes through the target position. Moreover, as will be described below, in accordance with the invention it is essential for elimination of dynamic lag for the system to have predicted target position, at each measurement time, and to have this prediction available at measurement time. It is necessary for the prediction to be available at measurement time so that any error (or difference) between predicted target position and measured target position can be determined, at or just after the actual position measurement. In order to be able to predict target position at measurement time, it is thus necessary to predict when the next measurement time will occur. This prediction of next measurement time can be accomplished because the invention has available a target trajectory, i.e. a description of the target's position as a function of time. Of course, the trajectory itself is subject to correction if necessary, but nevertheless the trajectory is used for determining the next measurement time and then from the next measurement time, again using the trajectory, the predicted target position. Thus, the trajectory is changed or updated as necessary to maintain coincidence between target and sensor at measurement time.

Another consequence of the difference between Patent 4,825,055 and the present invention is the following. In the referred to patent, when the current trajectory is employed to predict a future target position, that signal will be used to drive the servos in order to position the sensor so as to measure the actual target position relative to the predicted position. Because all real world devices are not perfect, and as a consequence of the system calibration, error terms are derived. These error terms identify the difference between the apparent sensor position and the sensor actual or true position. In order to compensate for these errors, the predicted position has subtracted therefrom the error terms. The resultant is used to position the sensor. Since by definition the error terms are additive, the net result of subtracting the error terms from the computed position taken together with the physical effect of adding the error terms as a consequence of positioning the sensor, produces a net result of zero, which is of course the desired result.

In contrast, the present invention does not employ the predicted position to drive the sensor. Rather, the sensor is positioned wholly apart from the predicted target position. As a result, in accordance with the present invention, the system also computes estimated error terms, but in contrast to the prior patent, those error terms are added to the predicted target position. To predict the track point as precisely contaminated and when subtracted from the contaminated measurement will produce systematic error-free trajectory error, which is the desired result, allowing correction of the trajectory so as to eliminate or minimize the trajectory error at the next measurement time, and so on.

BRIEF DESCRIPTION OF THE DRAWINGS

The present invention will now be described in further detail so as to enable those skilled in the art to make and use the same in the following portion of the specification when taken in conjunction with the attached drawings, wherein.

DETAILED DESCRIPTION OF THE PREFERRED EMBODIMENT

Figure 1:
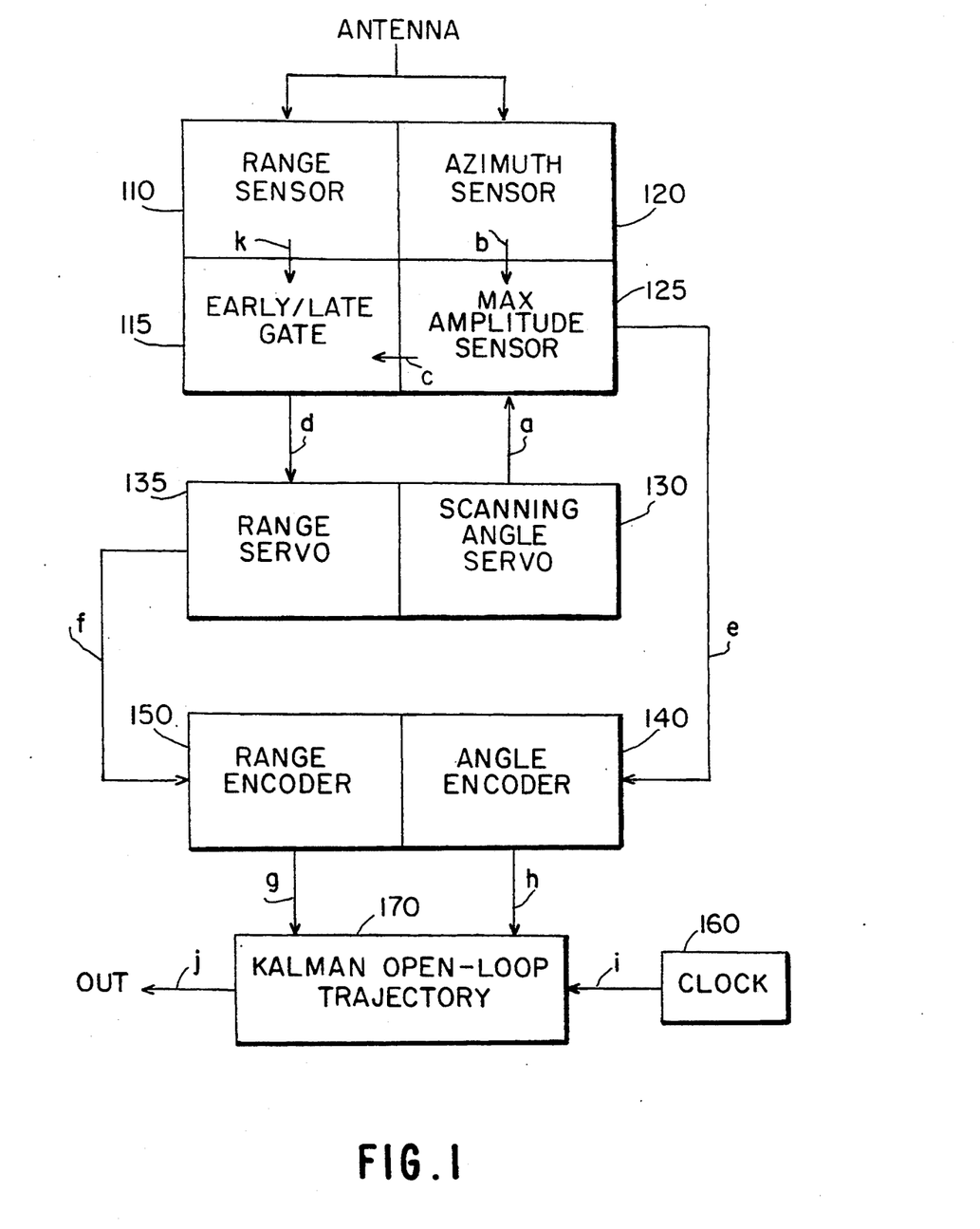
FIG. 1 is a block diagram of a typical or prior art radar system.

Before referring to the preferred embodiment, reference is made to FIG. 1 which illustrates a typical prior art radar system which does not employ physical pointing. More particularly, the system of FIG. 1 is a typical radar scanning sensor. The conventional components include a range sensor 110 and azimuth sensor 120. Associated with the azimuth sensor is a maximum amplitude sensor 125. An early/late gate 115 is associated with the range sensor 110. A scanning angle servo 130 drives the antenna in azimuth. A range servo 135 responds to the early/late gate 115. An angle encoder 140 and a range encoder 150 generate offset data from the radar and a Kalman open-loop trajectory processor 170 responds to the output of the angle encoder and range encoder as well as time of year clock 160 to produce an output signal. The scanning angle servo 130 drives the antenna with the signal a. Target position as a function of azimuth is reflected in the signal b. When that signal reaches a maximum amplitude, as determined by the maximum amplitude sensor 125, signals c and e are generated. Signal c initiates the early/late gate 115 which responds to the range sensor signal k to generate a signal d indicating target range. The maximum amplitude sensor 125 produces an output signal e which is applied to an angle encoder 140 to generate an azimuth angle indication h. The range servo 135 responds to the signal d to generate a signal f which is applied to a range encoder 150, producing an indication of range g. A series of sequential position azimuth and range are used in the Kalman open-loop trajectory processing, along with the time of year clock signal i, so as to generate an open-loop trajectory signal j. It is important to realize that whatever errors are generated in the encoders 140 and 150 cannot be isolated in the output signal j. It is this inability to isolate the errors from the data, in the processing illustrated in block 170, that is corrected in accordance with the present invention.

Figure 2:
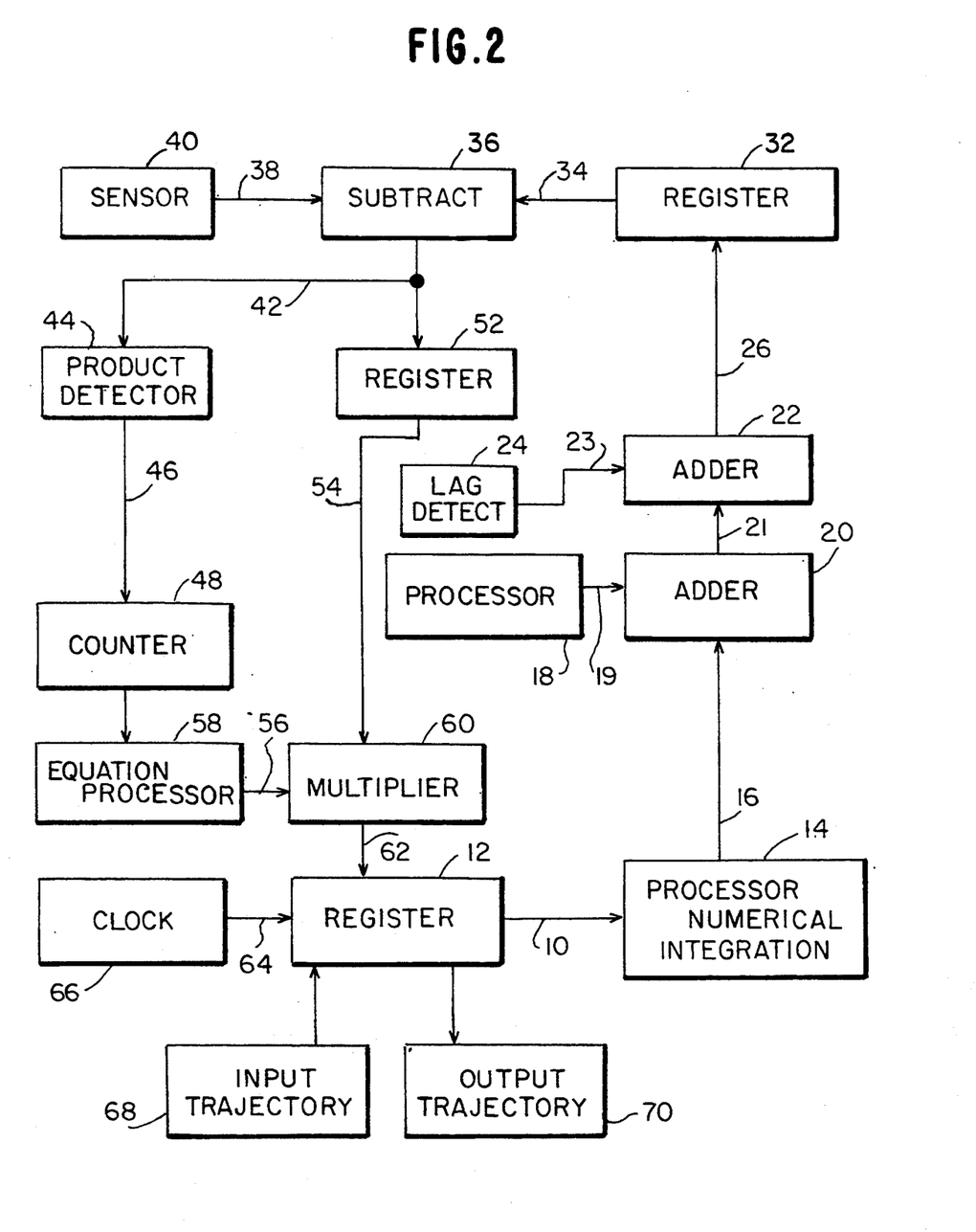
FIG. 2 is a block diagram illustrating the apparatus and process employed in accordance with one embodiment of the present invention.

Reference is now made to FIG. 2, which is a functional flow diagram, that sets forth in schematic fashion the Closed-Loop Control System of this invention. The invention uses conventional elements combined in a unique manner by a pre-measurement trajectory control loop to prepare for its at-measurement-time controlled trajectory modification processing. The basic concept of this invention is to provide for and control both the prediction and trajectory production loops, thereby preventing target-sensor separation and produce an error-free history of the measurement and its derivatives. This is done by two basic but independent loops connected at one end by a subtractor 36 and at the other end by a current trajectory register 12.

Before describing the processing in detail, a brief overview will be helpful. Generally, the numerical integrator 14 operates from the then-current trajectory to generate a position estimate for the target at the next measurement time. This position estimate 16 is corrected in the adder 20 by summing the position estimate 16 with system error model/coefficients 19 which have been precisely calibrated to eliminate or compensate for system errors. Thus the output 21 of the adder 20 can be considered a system error corrected position estimate. The system error corrected position estimate 21 is then input to an adder 22. The other input 23 to the adder 22 is compensation for servo lag errors. Accordingly, the output 26 of the adder 22 can be considered a position estimate which has been corrected for system errors (by the system error input 19) and by servo lag compensation 23. The corrected position estimate 26 is then stored in the register 32. At the appropriate time (i.e. measurement time), the corrected position estimate 34 (the output of the register 32) is compared in the subtractor 36 with the at measurement time measured position 38 which is of course contaminated with system errors.

The result of the comparison, i.e. the difference between the corrected position estimate 34 and the actual encoder/sensor measurement 38, produces a system error-free trajectory-error. The trajectory-error is used for two purposes. One purpose is to correct the trajectory itself in order to compensate for the error. At the same time, a sequence of errors is examined to determine if the sequence is trended or non-trended. Ideally, if the sequence is non-trended, it indicates that a sequence of position estimates, if not exactly locked to the target, have at least been scanning across the target at the various at-measurement-time measurements. The non-trended sequence of errors can also be taken to mean that only minimal correction is necessary to the trajectory. Alternatively, if the sequence of errors is trended, then larger modifications to the trajectory are called for in order to bring the target position to sensor null.

In order to determine whether the sequence of errors is trended or non-trended, pairs of sequential errors are isolated. A product is obtained for each pair of sequential errors or the signs of the sequential errors are compared. If the product of sequential errors is negative or, alternatively, if the sequential errors have different signs, then it can be concluded that the sequential errors are non-trended. For example, if the sequential errors have different signs, then that is evidence of lack of a trend in the errors. On the other hand, if the product of the errors have positive signs or if sequential errors have the same sign, then trended errors have been detected.

The system uses the current state vector (trajectory) 68 composed of time, position, velocity, and constant acceleration (TPVA) having initially been determined by a conventional derivative control process as defined hereinabove for its initiation.

After performing its function of initializing the operation of the invention, the initial trajectory 68 is modified (if necessary) each cycle and replaced with an improved current trajectory in a manner to be described. hereinbelow.

This current state vector (trajectory) 68 is received and held for one cycle in conventional storage register 12. The current trajectory 68 is fed to a numerical integrator 14. The numerical integrator 14 by double integration of the current trajectory 10 produces a trackpoint 16 of the next sensor-encoder measurement.

The output 16 of numerical integrator 14 is modified by adding system error terms that, if omitted, would appear as errors in the trajectory. The system errors are computed in a conventional multiprocessor or microprocessor 18. Microprocessor 18 generates a composite for the several systematic or deterministic error model terms. Input to microprocessor 18 is the external calibration of location (survey), sensor orientation, refraction and transit-time, system errors that should be accounted for in all guidance and control instrumentation. System error computation may vary from look-up tables formed of conventional registers and adders, to dynamic on-line calculations of a very detailed nature prepared in microprocessor 18. A conventional adder 20 combines the system error additions 19 of microprocessor 18 with the output 16 of the numerical integrator 14. The introduction of correction set 19 changes the output 16 of numerical integrator 14 to a contaminated estimate of the next sensor measurement where the term contaminated means within a predetermined degree of precision. A conventional adder 22 combines the encoder-sensor-target separation prevention additions 23 of lag detector 24 with the contaminated output 21.

Input to the lag detector 24 is external calibration of both the sensor and encoder separation errors that must be accounted for in all scanning instrumentation. The introduction of correction 23 guarantees that the output 16 from the numerical integrator 14 is a lag-free contaminated estimate of the next actual sensor-encoder measurement. The lag-detector addition 23 assures that the sensor-encoder combination is lag-free; the input to 21 and its encoder output 26 must be well defined to prevent prediction target-sensor separation.

The output 26 from adder 22 containing the lag-free system error contaminated predicted next trackpoint is received by a conventional digital storage register 32. Prediction trackpoint output 34 from digital storage register 32 is at-measurement-time compared to the sensor-encoder measurement output 38 from sensor-encoder 40 in subtractor 36. Subtractor 36 produces a trajectory error 42 that is lag-free and system error-free. This data is used in the two loops as follows. A sensor-null on-off test is performed by a maneuver detector 44 based on a product of sequential trajectory errors 42.

If the product 46 of sequential error terms is negative, the target has crossed sensor-null while if the product is positive, the target has moved to one side of sensor-null.

The plus or minus output 46 is applied to a digital counter 48. For each instance of a negative sign, the counter is incremented, and for each instance of a positive sign, the counter is decremented. In order to maintain this oscillatory action, an upper limit of the counter is set at some predetermined positive number (thereby ensuring some minimum gain for the trajectory adjustment algorithm). On the other hand, for each instance of a positive sign in the products formed by the product detector or multiplier 44, the counter 48 is decremented. The status or contents of the counter is employed as the b number which determines the gain of the trajectory correction algorithm. The output 50 of counter 48 will decrease when the sensor is off-null and increase when crossing sensor-null. Counter 48 generates an adaptive gain signal 50, a "b" operator, whose value is large when sensor-null is on-target and small when off-target. The count-up rate is constant while the count-down could vary when the data are off-target, evidencing a maneuver.

Polynomial equations 58 use the adaptive gain 50 to generate position, velocity and acceleration trajectory adjustment gain 56. More particularly, the equation processor 58 uses the b number 50 (the output of the counter 48) as an adaptive gain signal, i.e. an operator. This b number is employed along with the polynomial equations reproduced below to modify three adaptive gain weighting factors, particularly, $\alpha$ (the basic position multiplier), $\beta$ (the first derivative or velocity multiplier) and $\gamma$ (the second derivative or constant acceleration multiplier). More particularly, in one embodiment of the invention:

$$\alpha = 1 - b^3 \tag{1}$$

$$\beta = (1 - b^2)(1 + b) \tag{2}$$

$$\gamma = (1 - \beta)^3 \tag{3}$$

A multiplier 60 combines the current trajectory error 54 with the trajectory modify gain 56; the position, the velocity and acceleration values produce a modification 62 to the current trajectory 68 (now considered the old trajectory) thereby producing a modified trajectory 68. The intent of the modification to the trajectory is to reduce the trajectory error to zero so as to lock the sensor to the target.

To recapitulate, assume that the subtractor 36 produces a sequence of error signals $\Sigma_1$, $\Sigma_2$, etc. The signals are directed both to the register 52 and the product detector 44. As a consequence of receiving the sequence of error signals, the product detector 44 produces a signal 46 which represents a product of two sequential error signals such that it produces a signals $46_1$, which is based on the product of $\Sigma_1$ and $\Sigma_2$, it produces a signal $46_2$, at a later time, which is a result of the product $\Sigma_2$ ad $\Sigma_3$, and still later in time it produces a signal $46_3$, which is a result of the product of $\Sigma_3$ and $\Sigma_4$, etc. Each of the signals 46 is in, or is reduced to, binary form to represent the sign of the product of a pair of errors ($\Sigma_1 \times \Sigma_2$, $\Sigma_2 \times \Sigma_3$, etc.). The sequence of signals from the product detector are input to the counter 48. The counter 48 produces a signal representing the contents of the counter as follows. If a signal $46_1$ is positive (representing two sequential error signals of the same sign, then the counter will be decremented such that $b_1=b_0-1$. On the other hand, if two sequential signals from the product detector 44 are negative (representing sequential error signals of different signs), then $b_1=b_0+1$ (up to the limit). The output of the counter 50, or the b number, is used to construct the coefficients $\alpha$, $\beta$ and $\gamma$ as represented in Equations 1-3, in the equation processor 58. The output of the equation processor 58, the signal set 56, is provided to the multiplier 60. The other input to the multiplier 60 is the current error signal $\Sigma$. The output of the multiplier 62 represents the corrected trajectory. If, for example, the previous trajectory included the components $x_1$, $v_1$ and $a_1$ (representing position, velocity and acceleration, respectively), then the multiplier 60 would correct this trajectory such that $x_2=\alpha\Sigma_1+x_1$, $v_2=\beta\Sigma_1+v_1$ and $a_2=\gamma\Sigma_1+a_1$. In other words, the trajectory, including terms $x_2$, $v_2$ and $a_2$ (representing corrected position, velocity and acceleration, respectively) in light of both the error measurement produced by the subtractor 36 and the appropriate coefficient representing the correctness of the trajectory is evidenced by the product detector or the contents of the counter 48.

New trajectory 68 is maintained in storage register 12 that is also fed with precise time of year, the independent variable, 64 to produce an updated trajectory. New trajectory 68 is routed externally through terminal 70. Updated trajectory minus time 10 is then rerouted into the numerical integrator 14, becoming the current trajectory to predict the next sensor-encoder measurement.

The contaminated sensor data 38 is continuously compared with the at-measurement-time trajectory generated trackpoint 34. With each new comparison the trajectory is modified to keep the sensor crossing the target.

In direct relation to the increased interval between trajectory modifications, the sensor will more slowly oscillate across the target for reduced system precision.

Summarizing, the operation of the apparatus and process illustrated in FIG. 2 uses the production of a trajectory in a register 12 which, as will become clear in the following explanation, exists prior to the next measurement epoch. By using the trajectory in the register 12, it is double integrated in the processor 14 for the next measurement epoch. The resulting position estimate is then modified in the adders 20 and 22 to compensate for system errors and lag errors. The compensation of the adders 20 and 22 is designed so that the position estimate (which is then stored in the register 32) will be comparable against a physical target position measurement. The compensation ensures that the difference (or error) is not contaminated by system errors or lag errors. In any event, at the next measurement time, the sensor 40 produces a position measurement and the subtractor 36 determines the difference between the predicted position (from the register 32) and the actual measured position (from the sensor 40). This difference is inserted into two paths, in a first path via the register 52 and in a second path via the product detector 44. The position error or difference contained in the register 52 will be used in the multiplier 60 for trajectory correction. However, in order to determine how much trajectory correction is required, the product detector 44 (or maneuver detector) is employed. As has been noted, the output of the subtractor 36 is an error, i.e. a difference between a position measurement and a position estimate. That error includes an error polarity. The product detector 44 obtains the product of at least the polarity of the most recent error and its predecessor. If the product detector shows a continuing sequence of negative signs (if the polarity of sequential errors differs), then the error is non-trended, i.e. we are tracking the target at or near sensor null. On the other hand, if the output of the product detector is positive (or predominantly positive), then the error is trended, i.e. the target and sensor position are not continually crossing. These two conditions are differentiated by the contents of the counter 48 as follows. Each time the output of the product detector 44 is negative, the counter is incremented, and for each instance in which the output 46 is positive, the counter is decremented. An upper limit is set for the contents of the counter at some predetermined positive number. The status or contents of the counter is employed as a b number which determines the gain of the trajectory correction algorithm. The output 50 or the b number will decrease when and as the predicted position and target position diverge, whereas the output 50 of the counter 48 will increase as the target position continually crosses sensor null. The adaptive gain 50 is used to generate position velocity and acceleration trajectory adjustment gains 56. Each of the respective gains is then combined with the trajectory error 54 to produce a modified trajectory. The now-modified trajectory is then double integrated in order to obtain a new position estimate, and so forth.

Figure 3:
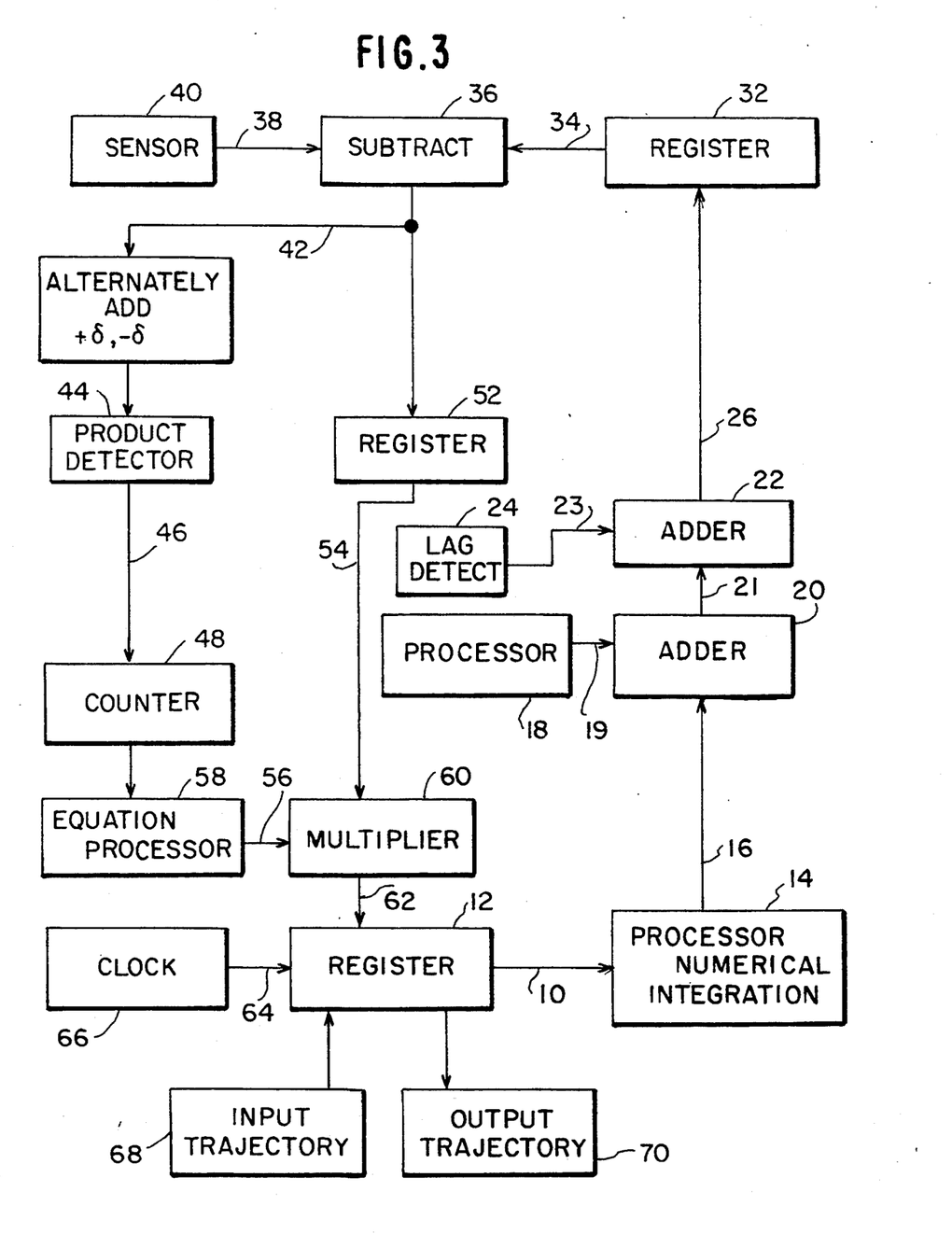
FIG. 3 is a block diagram of another embodiment of the present invention.

From the preceding discussion, those skilled in the art will recognize how the contents of the counter 48 (the b number) controls the gain of the correction loop. In order to ensure that there is some minimum gain, the algorithm of FIG. 3 adjusts the error, the signal 42, by alternately adding and subtracting an offset $\delta$. The quantity $\delta$ is selected so that the trajectory is stable, i.e. non-changing, when the magnitude of the error is substantially identical to $\delta$.

Calibration

In order for the error correction to be accurate and meaningful, calibration is important. Calibration of the device as described herein is best performed by using the device described in my prior patent, 4,825,055. In general, calibration of the device described herein is similar to the calibration described in the patent under "Self-Calibration". In this description, the device of Patent 4,825,055 which is used as the standard will be referred to as the standard. Typically, the standard will not be on the same mount as is the sensor of the application. Nevertheless, we can still transfer the stellar calibration from the standard to the device of the invention.

Firstly, in respect of the lag detector 24, it is necessary to evaluate the installed encoder precision and linearity since it is the encoder output that is used as position data. The device of the invention treats the lag detector 24 as part of the system error model. In general, the lag detector is a computer process that must evaluate the encoder performance by causing each servo to move each sensor such that the smallest step in the installed encoder is evaluated to prevent sensor/encoder separation or lag. The encoder should be error-free to its designed precision. For example, if the encoder should be precise at 20 bits, then in the calibration, the amount will be moved at a fixed rate and the encoder output is compared at each sequential value, in other words, a precision of 1 part in a million. Preferably, the calibration is carried out for each different encoder output value so as to produce an error-free encoder.

The stellar error-free orientation of the standard must be transferred to the device of the present invention. However, the stellar orientation of the device of the invention can be calibrated only after refraction and transit-time have been accounted for in the data process. Refraction and transit-time errors are not system physical calibration dependent and are computed independent of the standard. Both the device of the present invention and the standard sensors must be first order surveyed to precisely define their location. The timing of the device of the present invention should be as precise as the standard, e.g. $10^{-5}$ seconds. Both the device of the present invention and the standard locations are first ordered surveyed and are not time error limited so the device of the invention can define the exact difference from the standard that it will see a measurement time on any azimuth, elevation or range. Precise spatial difference between the device of the invention and the standard can be computed for each cycle in three dimensions as required.

From a practical vantage point, the calibration error model of the device of the invention consists of, at most, east, north and up, with perhaps an occasional need for droop, skew and non-orthogonality terms. If the precision or data rate of the device of the invention is high enough, a non-calibration random error filter may be needed.

The sensor orientation for the device of the invention is calibrated using a calibration target. The signals from the device of the invention are made to agree at measurement time with the standard target position. A known spatial difference would be needed only if the systems are not geophysically configured. The standard is error-free and the relative location of the two sensors, i.e. the device of the invention and the standard, is well defined. The required correction is added or subtracted each cycle as needed to the position estimate found by the device of the invention, the exact stellar orientation calibration has been transferred. Ultimately, the trajectory produced by the device of the invention is used to point the standard's optical sensor to the target without error. This stellar orientation calibration may be transferred to any mobile system. However, its operational process must be based on an inertial platform. Given a large platform, the system of the present invention and the standard systems may be co-located.

A further improvement could be to change the inertial platform data processing to that of the closed loop standard and become error-free. Such an inertial system will require far fewer on-line position upgrades.

I claim:

1. A method of tracking a target with a sensor positioned without reference to the target and generating signals identifying target position at each of a plurality of measurement times, said method comprising the steps of:
    a) generating a sequence of error signals, each error signal representing an error between sensor and target position at measurement time by comparison of a predicted target position for the measurement time and one of said signals identifying target position at the measurement time,
    b) determining, from said sequence of error signals, products of sequential pairs of at least the polarity of said error signals,
    c) summing at least the polarity of the products to indicate any trend in a sequence of said error signals to produce a gain factor,
    d) sequentially storing that one of said error signals most recently generated,
    e) generating a trajectory correction by combining said gain factor and said stored error signal,
    f) developing from a current trajectory and said trajectory correction a corrected trajectory, and
    g) developing from a corrected trajectory a predicted target position for the next estimated measurement time.

2. A method as recited in claim 1 including the further steps of:
    h) correcting the predicted target position to compensate for predicted system and lag errors, and
    i) using the corrected predicted target position to develop a further error signal.

3. A method as recited in claim 1 which further includes:
    j) providing two control loops, implementing steps b) and c) in a first control loop and implementing steps d), e), f) and g) in a second control loop.

4. A method of tracking a target with a sensor positioned without reference to the target, said method comprising the iteratively repeated steps of:
    a) based on a current trajectory, estimating target position at a future measurement time,
    b) measuring target position, subsequent to step a) and at said measurement time and obtaining a difference between said estimated target position and said target position measured at said measurement time, and
    c) updating said current trajectory prior to estimating target position for a next measurement time as follows:
        c1) obtaining a difference between said estimated position and said measured position as determined in steps a) and b) respectively,
        c2) determining and quantifying any trend in a sequence of differences of step c1) on sequential iterations,
        c3) adaptively weighting a trajectory gain coefficient in relation to the quantified trend of said difference of step c1),
        c4) using the difference of step c1) and the adapted gain coefficient of step c3) to obtain a corrected trajectory.

5. A method as recited in claim 4 wherein said estimated target position of step a) is corrected prior to step b) in order to compensate for system errors and lag errors.

6. A method as recited in claim 5 in which said system errors are added to the estimated target position of step a).

7. A method as recited in claim 4 or claim 5 or claim 6 wherein said step c2) is implemented by:
    c21) obtaining, in one iteration, a product of (1) said difference and a (2) difference obtained on a prior iteration of step c1),
    c22) providing a counter and either incrementing a count of said counter on instances of a negative sign of said product, up to but not beyond a first predetermined value or decrementing a count of said counter on instances of a positive sign of said product but down to but not below a second predetermined value, and c23) applying the count of said counter as quantifying any trend in a sequence of differences of step c1) on sequential iterations.

8. A method as recited in claim 4 which includes the further step of:

d) moving said sensor with a predetermined motion for periodically scanning a given region in space.

9. A method as recited in claim 4 which includes the further step of:

d) prior to executing step a), based on a current trajectory, estimating a future measurement time.

* * * * *